United States Patent [19]

Dispoto et al.

[11] Patent Number: 4,680,645

[45] Date of Patent: Jul. 14, 1987

[54] METHOD FOR RENDERING GRAY SCALE IMAGES WITH VARIABLE DOT SIZES

[75] Inventors: Gary J. Dispoto, Mt. View; Larry R. Mather, Menlo Park; John D. Meyer, Mt. View, all of Calif.

[73] Assignee: Hewlett-Packard Company, Palo Alto, Calif.

[21] Appl. No.: 899,358

[22] Filed: Aug. 25, 1986

[51] Int. Cl.$^4$ .......................... H04N 1/04; H04N 1/22; G01D 15/18

[52] U.S. Cl. ..................................... 358/298; 358/283; 346/1.1; 346/140 R

[58] Field of Search ........................ 358/283, 298, 296; 364/519, 518; 346/1.1

[56] References Cited

U.S. PATENT DOCUMENTS

| | | | |
|---|---|---|---|
| 4,342,051 | 7/1982 | Suzuki et al. | 358/298 X |
| 4,449,150 | 5/1984 | Kato | 358/283 |
| 4,503,444 | 3/1985 | Tacklind | 346/1.1 |

Primary Examiner—E. A. Goldberg
Assistant Examiner—Patrick W. Foster
Attorney, Agent, or Firm—Edward Y. Wong; Saundra S. Hand

[57] ABSTRACT

The capability of varying sizes of a dot in a printer is fully exploited to provide a gray scale image of superior quality. Errors in gray level are used to modulate the sizes of the dots in producing the image.

6 Claims, 1 Drawing Figure

| DOT SIZE | OPTICAL DENSITY |
|---|---|
| $S_1$ | $D_1$ |
| $S_2$ | $D_2$ |
| $S_3$ | $D_3$ |
| ⋮ | ⋮ |
| $S_N$ | $D_N$ |

FIG 1

METHOD FOR RENDERING GRAY SCALE IMAGES WITH VARIABLE DOT SIZES

FIELD OF THE INVENTION

This invention relates to the generation on paper of continuous tone images without artificial image artifacts like noise with the use of a printer capable of printing variable dot sizes.

BACKGROUND OF THE INVENTION

In the area of digital printing, representation of the intensity of a color on paper, i.e., the gray level, has been the object of a wide variety of algorithms published in the last decade. Digital printers are defined as those printers that are capable of making a mark, usually in the form of a-dot, of a given, uniform size and at a specified resolution in marks per unit length, typically dots per inch (dpi), on paper. To use such a digital printer to give the impression of color intensity, it has been common to place the marks, or dots, on the paper according to a variety of geometrical patterns such that a group of dots and dotless blank spots when seen by the eye gives a rendition of an intermediate color tone between the color of the initial paper stock, usually white, and total ink coverage, or solid density. In the ensuing paragraphs, discussions will be made in terms of white paper stock; it is understood that white paper stock is used as an illustration and not as a limitation of any invention.

An obvious problem arises when the resolution of the dot matrix on the paper is not very high, for example, 100 dpi or less, and the geometrical patterns being used become particularly visible to the eye. In this case the viewer is distracted from the image being represented by the image artifacts of geometrical patterns themselves and perceives the impression of an image of poor quality. The obvious solution to this problem is to work at very high resolutions, for example, 300 dpi or greater, so that those artifacts are less perceived and their negative effects become less glaring.

In 1976, Robert W. Floyd and Louis Steinberg published a paper in the *Proceedings of the S.I.D.*, Vol. 17/2, entitled "An Adaptive Algorithm for Spatial Greyscale". In it they described an algorithm which they called "Error Diffusion" (ED). This algorithm provides a method for a gray scale with bilevel devices, that is, dot or no dot. According to this prior art scheme, gray level data representing a continuous tone image is subjected to a thresholding process whereby gray levels above a chosen threshold, for example, 50%, are assigned a dot to be printed and those below are not assigned a dot. The coarseness of this method is compensated for by keeping track of the intensity error due to this process and propagating this error in specified amounts to adjacent picture elements, or "pixels", to weight the pixels in the thresholding process. This approach results in a more accurate representation of a grey tone over a small area encompassing several dots. Hence, perception of the image artifacts is diminished, and a better quality gray scale image is generated. Furthermore, the ED algorithm retains good edge quality in generated images to minimize the inherent "fuzziness" of a bilevel generated image.

It has been observed by subsequent investigators that the ED approach, even at resolutions of 300 dpi, still suffers severe limitations in producing quality images. See, for example, C. Billotet-Hoffman and O. Bryngdahl, *Proceedings of S.I.D.*, Vol. 24/3, p. 253, "On the Error Diffusion Technique for Electronic Halftoning"; Yigdl Gur and F. X. D. O'Donnell, TAGA Proceedings, 1985, p. 603, "Half-toning Using Ink-Jet: Part I. Algorithm of Discretization"; and Yigal Gur and F. X. D. O'Donnell, *TAGA Proceedings*, 1985, p. 611, "Halftoning Using Ink Jet: Part 2. Tailoring Algorithm to a Printer", the contents of all of which are incorporated herein by reference. Specifically, with the ED approach in producing gray scale images, the dots of a binary printer are of greater diameter than the separation of the addressable points; therefore, they can overlap. This overlapping then produces a nonlinear response to the representation of the grey tone discretization. In addition, the thresholding process also introduces undesirable patterns or textures that are visible to the eye when certain grey levels are printed. Gur and O'Donnell describe a means of randomizing the threshold to solve the latter problem. This solution, however, requires more complex and time consuming algorithms.

SUMMARY OF THE INVENTION

The present invention applies the ED technique to determine dot sizes rather than dot placement of the prior art. Specifically, ED is used in conjunction with a printing technique that is capable of producing a range of dot sizes on the paper. An example of such a printing technique is described in U.S. Pat. No. 4,503,444, *Method and Apparatus for Generating a Gray Scale With a High Speed Thermal Ink Jet Printer*, which is incorporated in whole by reference. In accordance with the preferred embodiment of the invention, an ED algorithm is used to determine the error of a dot whenever the dot is printed. The error is then diffused to adjacent pixels where, instead of being used for weighting the pixel in a thresholding process, the error is used to determine the proper dot size for the pixel, with the dot size ranging from zero, in which no dot will be made, to a maximum. As a result, no coarse thresholding process for a binary printer is now required as in the prior art. The initial quantization of the grey level and assignment of dot to be printed can now be very accurate with only a small error to be propagated to the adjacent pixels. This has the added advantage of enabling the use of a very compact algorithm wherein only a few adjacent pixels are recipients of the error. Hence, the tone may be represented over a smaller area with a resulting enhancement in the impression of detail perceived by the viewer. This will also mean that the algorithm can be processed very fast since a minimum number of pixels will be involved.

A further advantage of the invention is that now quality gray scale printing can be achieved at resolutions previously thought too low to be suitable for the ED approach. Specifically, it has been found that a gray scale image produced in accordance with the invention using a variable dot size printer running at 100 dpi and having 16 levels of dot sizes between white paper and solid coverage results in an excellent quality image free of image artifacts. This technique therefore produces the best representation of gray scale that the printer is capable of while at the same time making the best use of the resolution for detail rendition.

This method has the further advantage of minimizing the nonlinearity caused by the overlapping of dots which occurs with bilevel printers. With the multiple dot size ED technique in accordance with the invention, dot overlap occurs only for the few dot sizes generated for near solid ink coverage. But since the dark areas of an image tend to be less significant as opposed to the middle to higher lightness cones, this overlap is not perceived by the viewer as an image defect. This problem can be even further reduced by doing the calculations for the ED in optical density units. These units relate naturally to the way in which the eye responds to the printed image and therefore are automatically more accurate. In this manner a particular optical density is related to a particular dot size. So, when the final data determining dot sizes is produced to drive the printer, the dots become a representation of the optical densities of the original image data. In this way, a natural rendition devoid of nonlinear artifacts in the gray scale can be achieved.

Only with the advent of printers capable of producing variable dot sizes on paper has it been possible for an ED algorithm to be used to determine dot sizes to generate gray scale images accurately and efficiently in accordance with the present invention.

BRIEF DESCRIPTION OF THE DRAWING

FIG. 1 shows a lookup table used to determine the dot size corresponding to a density value or gray level in accordance with the invention.

DETAILED DESCRIPTION OF THE INVENTION

In a typical ED analysis in the prior art, gray levels are determined in three steps: printing decision based on a thresholding process, error calculated as a result of the printing decision, and error propagated, or diffused, to adjacent areas or pixels. In an image representation, each picture element (pixel) of the image has an actual picture level $I(i,j)$, where i represents the ith pixel and j represents the jth scan. Since this picture level may be a finite level in a continuum of tone levels, the bilevel selection of printing in a binary system would inherently have an error unless the actual picture level happens to be either white, viz., dotless, or total ink coverage, viz., full dot. Therefore, any printing decision for a pixel would probably contain an error element. In a typical printing situation using ED, the printing decision for a pixel is made by comparing a corrected level of the pixel $Ic(i,j)$ with a threshold value T, that is, printing $P(i,j)=1$ when $Ic(i,j)$ is greater than T and $P(i,j)=0$ when $Ic(i,j)$ is equal or less than T. Then the error is calculated as the difference between the corrected level and the level actually put on paper, that is, $$E(i,j)=Ic(i,j)-ImaxP(i,j),$$

where Imax is the maximal density of a dot, typically an ink spot. This error $E(i,j)$ is propagated to adjacent pixels so that $$Ic(i+m,j+m)=Ic(i,j)=E(i,j)W(m,n)/SmW(min),$$

where $m=-k, \ldots, k$; $n=0, \ldots, k$, $W(m,n)$ is a matrix or kernel of error diffusion, and $SmW(min)$ is the summation of $W(min)$.

In the present invention, the printing decision $P(i,j)$ is not depended on a threshold T. Instead, the corrected picture level $Ic(i,j)$ is used as an address to a lookup table of varying dot sizes to correspond to various gray levels. In fact, the method in accordance with the invention allows a large degree of freedom in selecting the number of dot sizes to represent a number of gray levels. The error $E(i,j)$ is propagated to adjacent pixels to provide the corrected picture level $Ic(i+m,j+m)$ for the adjacent pixels. These corrected picture levels in turn determine the dot sizes for printing in the adjacent pixels. The image produced by the combination of pixels in accordance with this invention evidences high quality gray levels that have not been achieved with the prior art ED techniques.

Specifically, the methodology in accordance with the preferred embodiment of the invention can be illustrated with the following procedures:

1. Creating a density lookup table.

A test pattern is printed with dots of various sizes, where each dot size represents its own particular gray level. This test pattern is printed at a particular resolution of the printer. From this test pattern of various dot sizes, a density lookup table 101 which identifies each individual dot size 102 with the optical density 104 it is capable of producing is made. This lookup table is then used during the printing decision to determine the actual dot size to be deposited on a surface.

2. Converting Image data to optical density units.

An image to be represented is scanned, pixel by pixel. The resultant data on gray levels are converted, if it is not already in such a form, into optical density units. By using optical density units, the human factor in viewing gray levels are taken into account to present a more accurate gray scale image.

3. Storing image data.

The image data of rows of pixels, typically two at a time, is stored in a buffer, starting typically from the top leftmost pixel. For example, suppose two successive rows have the following densities in each series of pixels:

| X  | X  | D1 | D2 | D3 |
|----|----|----|----|----|
| D4 | D5 | D6 | D7 | D8 |

For each pixel whose optical density is D1, assume the dot size is S1 from the lookup table 101. If a density D1' falls between two densities D1 and D2 in the lookup table 101 without having a corresponding dot size for itself, the closest density value to it having a corresponding dot size is chosen instead. In this example, the closest density value would be D2.

4. Calculating error.

To determine the error E, take the difference between the actual density value D1' and the density value chosen D2, that is, $$E=D2-D1'.$$

This error E is then proportioned and propagated into adjacent pixels. For example, suppose $E1=7E/16$, $E2=E/16$, $E3=5E/16$, and $E4=3E/16$. Then the error distribution may be, starting from the top leftmost pixel:

| X  | X       | D4      | D2 + E1 ... |
|----|---------|---------|-------------|
| D4 | D5 + E4 | D6 + E3 | D7 + E2 ... |

This procedure is repeated until all pixels have been assigned a dot size corresponding to a gray level. When this is accomplished, the data is forwarded to the printer, which then deposits dots of various sizes in accordance with the input data. The image resulting will be substantially free of undesired image artifacts in accordance with the preferred embodiment of the invention.

We claim:

1. A method of generating a gray scale image on a surface comprising a matrix of pixels, the method comprising the steps of:
    depositing a first dot of a predetermined size on a selected pixel on the surface;
    determining a gray level error of the deposited first dot;
    scaling the error and assigning the scaled error to a pixel adjacent to the selected pixel;
    determining a size of a second dot in response to the scaled error to provide a second dot of a predetermined size;
    depositing the second dot of a predetermined size on the adjacent pixel.

2. The method of claim 1 wherein the step of determining a gray level error further comprises the step of determining the error in optical density units.

3. An apparatus for printing a gray scale image on a surface comprising:
    means for depositing a first dot of a predetermined size on a selected area of the surface;
    means for determining an error in gray level in the selected area;
    means for scaling the error and assigning the scaled error to an area adjacent to the selected area; and
    means for depositing a second dot of a predetermined size on the adjacent area, the second dot being of a size predetermined in response to the scaled error.

4. The apparatus of claim 3, wherein the means for determining an error further comprises a means for determining an error in optical density units.

5. The apparatus of claim 3, wherein the means for determining an error further comprises an error diffusion algorithm.

6. The apparatus of claim 5, wherein the means for determining an error further comprises an error diffusion algorithm.

* * * * *